Figure 1:
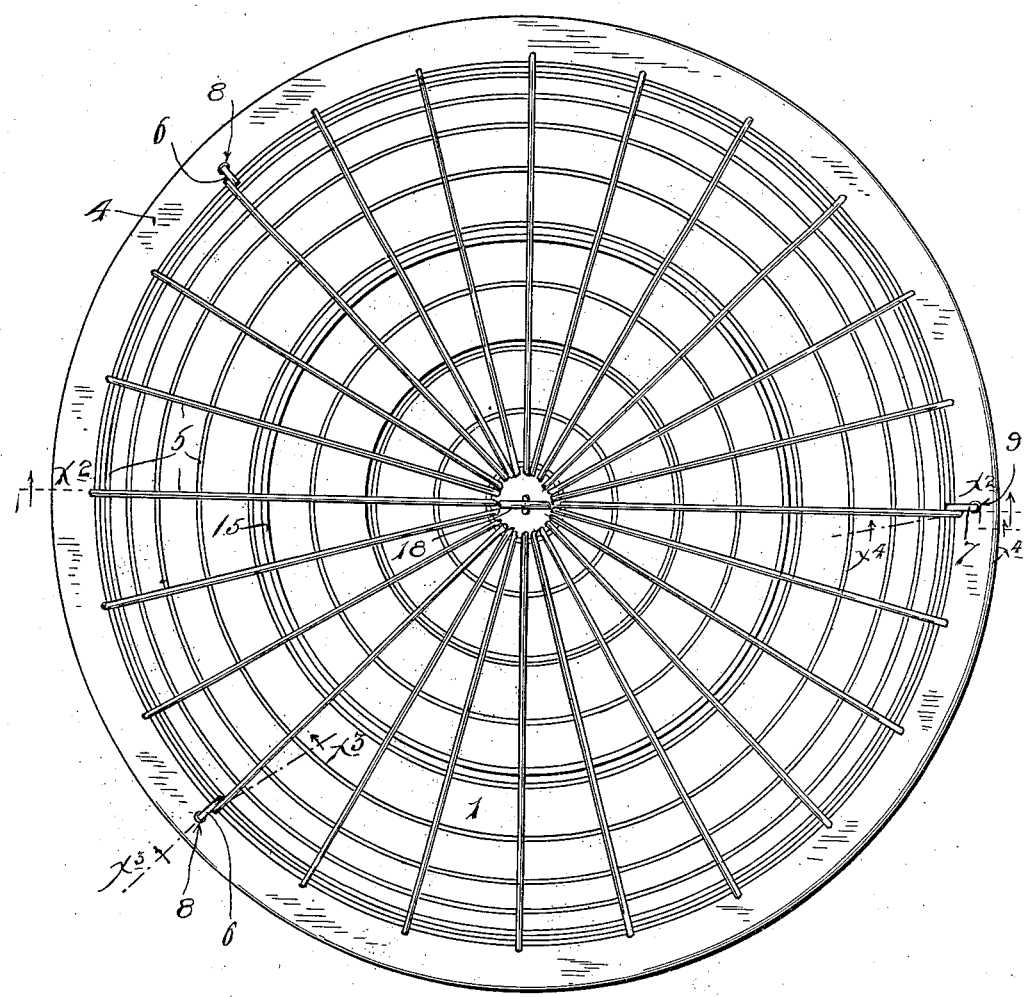

C. M. KLEIN.
FLY POISON CAGE.
APPLICATION FILED MAR. 10, 1911.

1,026,681.

Patented May 21, 1912.

2 SHEETS—SHEET 1.

Witnesses,
E. C. Skinkle
H. D. Kilgore

Inventor:
C. M. Klein,
By his Attorneys,
Williamson & Merchant

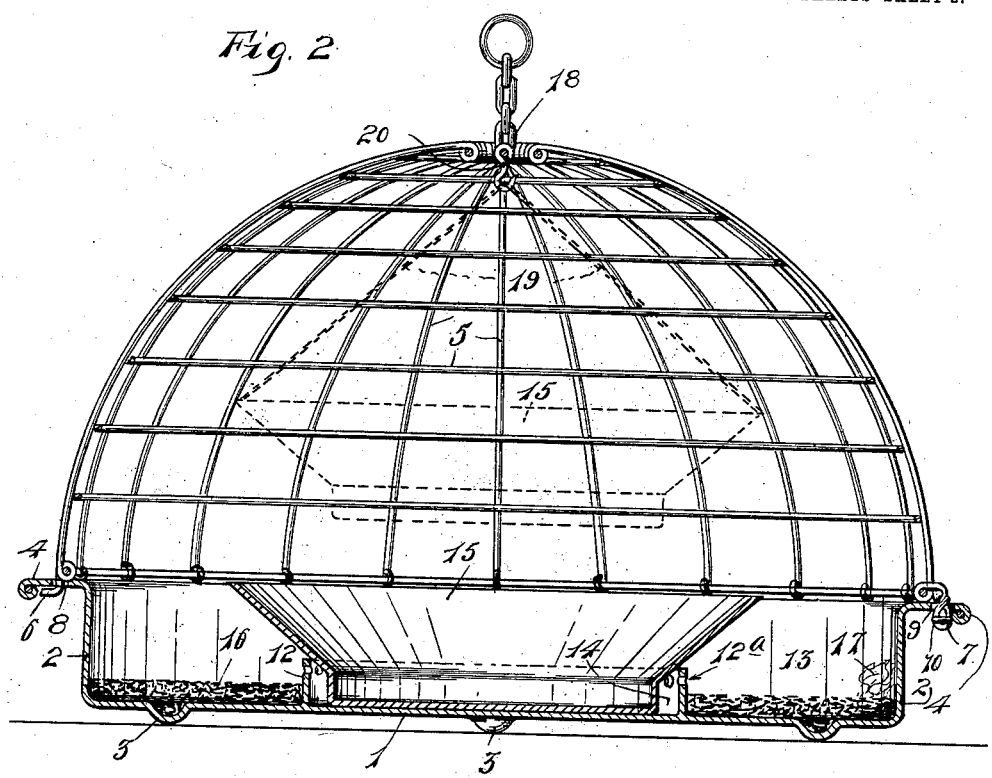
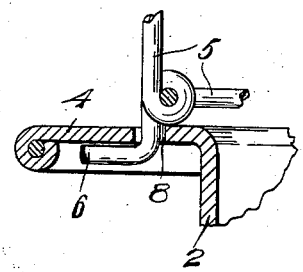
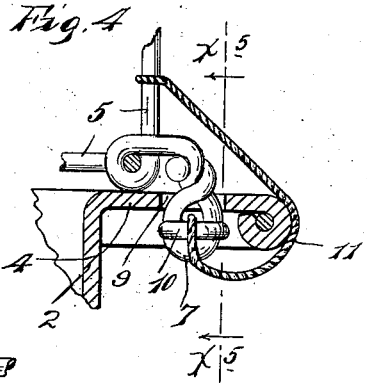
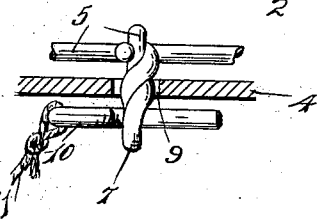

UNITED STATES PATENT OFFICE.

CHARLES M. KLEIN, OF MILLERVILLE, MINNESOTA.

FLY-POISON CAGE.

1,026,681. Specification of Letters Patent. Patented May 21, 1912.

Application filed March 10, 1911. Serial No. 613,639.

*To all whom it may concern:*

Be it known that I, CHARLES M. KLEIN, a citizen of the United States, residing at Millerville, in the county of Douglas and State of Minnesota, have invented a certain new and useful Fly-Poison Cage; and I do hereby declare the following to be a full, clear, and exact description of the invention, such as will enable others skilled in the art to which it appertains to make and use the same.

My invention has for its object to provide an improved cage adapted to contain poison for the extermination of flies or other noxious insects, and which will act as a protector to prevent children from getting hold of the poison contained within the cage. To this end, the invention consists of the novel devices and combinations of devices hereinafter described and defined in the claim.

The invention is illustrated in the accompanying drawings, wherein like characters indicate like parts throughout the several views.

Referring to the drawings, Figure 1 is a plan view of the improved device; Fig. 2 is a vertical section taken on the line $x^2$ $x^2$ of Fig. 1; Fig. 3 is a detail view, on an enlarged scale, taken on the line $x^3$ $x^3$ of Fig. 1; Fig. 4 is a detail view, on an enlarged scale, taken on the line $x^4$ $x^4$ of Fig. 1; and Fig. 5 is a detail view taken on the line $x^5$ $x^5$ of Fig. 4.

The numeral 1 indicates an annular bottom plate terminating at its outer edge in a vertically projecting annular flange 2. Pressed from the bottom plate 1 is a plurality of downwardly projecting supporting lugs 3 and the upper edge of the flange 2 terminates in an outwardly and horizontally projecting annular supporting flange 4. Detachably seated on the upper surface of the supporting flange 4 is a cage body or guard 5 preferably constructed of crossed wires, soldered or otherwise secured, and having an open bottom. The meshes formed by the wires of the cage body 5, in actual practice, will be of such size as to readily permit flies to enter the cage but will not be large enough to permit a child to put its hand therethrough. Certain of the upwardly projecting wires, which go to form the cage body 5, are extended below the base of the cage body 5 and terminate in a pair of hinge lugs 6 and a lock loop 7. The hinge lugs 6 are adapted for interlocking engagement with a pair of laterally spaced perforations 8 formed in the supporting flange 4 and the lock loop 7 projects through a perforation 9 formed in the supporting flange 4 when the cage body 5 is in a closed position. For holding the lock loop 7 against removal from the perforation 9 a lock pin 10 is provided and is adapted to be inserted through the lock loop 7, at the under side of the supporting flange, as best shown in Figs. 4 and 5, and thereby holds the cage body 5 locked onto the supporting flange 4 of the bottom plate 1. To prevent the lock pin 10 from becoming lost the same is secured to the cage body 5 by means of a flexible connection 11.

Rigidly secured to the base plate 1 is an annular and upwardly projecting retaining flange 12 having a plurality of holes $12^a$ punched therein. This retaining flange 12 is concentrically located within the supporting flange 2 and is spaced inward therefrom, thereby forming an outer compartment 13 and an inner compartment 14. Supported on the bottom plate 1, within the compartment 14, is a removable dish 15 adapted to hold poison in any suitable form, and with its outer edge portion projecting above and outside of the retaining flange 12. In actual practice, the retaining flange 12 will be spaced inward from the cage body 5 a distance sufficient to hold the poison containing dish 15 in a position to prevent a child from reaching the same by passing its fingers through the meshes formed by the wires of the body of the cage 5.

Placed within the compartment 13 is a quantity of sand 16, for the purpose of adding weight to the device to prevent the same from easily tipping over, and also to act as an absorbent in case any of the poison is spilled from the dish 15. If desired, a quantity of cotton 17 may be spread upon the upper surface of the sand 16 or, in case the sand is not used, is spread upon the bottom of the compartment 13. The purpose of the cotton is to catch the dead flies or insects so that the same may be easily and quickly removed from the cage, and also to act as an absorbent.

In some instances, it may be desirable to support the entire device from an overhead support instead of having the same supported by the lugs 3, and for this purpose, the cage 5 is provided at its top with a short chain 18; and, in some instances, it might also be desirable to support the dish 15 in an elevated position, as indicated by dotted lines in Fig. 2. If such is the case, the same is provided with flexible connections 19, indicated by dotted lines, and secured to a depending hook 20 secured to the lower end of the chain 18.

As a substitute for the removable dish 15 for holding the poison, a saturated pad, or sponge (not shown) may be placed in the compartment 14 and secured against accidental removal therefrom by any suitable means, such as a cord passed through the holes 12ª in the retaining flange 12.

What I claim is:

In a device of the kind described, the combination with a cage, of a pan-like bottom for said cage and having a cage supporting flange projecting horizontally from the top walls thereof, means for detachably securing said cage to said cage supporting flange, supporting feet pressed from said pan-like bottom, an upwardly projecting retaining flange secured to said pan-like bottom and spaced materially inward from the walls thereof, thereby forming inner and outer compartments, the walls of said pan-like bottom being materially higher than the said retaining flange, a removable dish supported on said pan-like bottom within said inner compartment and having its outer edge projected above said retaining flange and outside thereof, and an absorbent material placed within said outer compartment, substantially described.

In testimony whereof I affix my signature in presence of two witnesses.

CHARLES M. KLEIN.

Witnesses:
EUGENE KORKOWSKI,
J. C. DREXLER.

---

Copies of this patent may be obtained for five cents each, by addressing the "Commissioner of Patents, Washington, D. C."